United States Patent [19]
Pomroy

[11] 3,826,912
[45] July 30, 1974

[54] LIGHT BULB GUARD
[75] Inventor: James F. Pomroy, St. Paul, Minn.
[73] Assignee: Plastics, Inc., St. Paul, Minn.
[22] Filed: May 4, 1973
[21] Appl. No.: 357,113

[52] U.S. Cl. ............................................ 240/102 R
[51] Int. Cl. ............................................ F21v 15/00
[58] Field of Search ....... 240/102 R, 153; 24/16 PB, 24/20 TT, 284

[56] References Cited
UNITED STATES PATENTS

| | | | |
|---|---|---|---|
| 1,055,427 | 3/1913 | Sorensen | 240/102 |
| 1,642,646 | 9/1927 | Chase | 240/102 X |
| 2,258,032 | 10/1941 | Popp | 240/102 |
| 2,259,237 | 10/1941 | Baker et al. | 240/102 |
| 2,935,773 | 5/1960 | Weckesser | 24/16 |
| 3,570,497 | 3/1971 | Lemole | 24/16 X |
| 3,652,845 | 3/1972 | Thomas | 240/102 X |

Primary Examiner—Samuel S. Matthews
Assistant Examiner—Michael L. Gellner
Attorney, Agent, or Firm—Wicks & Nemer

[57] ABSTRACT

A light bulb guard including first and second identical half cage portions each including a semi-circular band portion on the inner end of the cage portion, a serrated tongue on one end of the semi-circular band portion and a slot in the other end, the tongue of each semi-circular band portion adjustably engageable in the slot of each semi-circular band portion together with a plurality of flexible fingers formed on and extending internally of the semi-circular band portions, and a recess formed in each semi-circular band portion for the reception of the rib of a light socket together with hook and recess means formed on the outer ends of each of the cage portions each engageable with the other.

9 Claims, 9 Drawing Figures

PATENTED JUL 30 1974 3,826,912

LIGHT BULB GUARD

The invention relates to guards for socket mounted bare light bulbs, and it is an object of the invention to provide a guard which requires only two identical half cage parts which are easily and simply engaged together to form the complete guard cage without the need for screws, bolts, clips or any other applied connectors or tools. With the two identical half cage parts only one mold is required. The cage halves are molded from polycarbonate which is relatively tough and heat resistant. The polycarbonate is a poor conductor and while hot it does not feel hot to the human touch as in the case of metal.

The half cage parts are engaged and locked together by slip-together adjustable means molded integrally with the cage half parts, and engagement of the half cage parts is quickly and easily accomplished. The cage parts include a construction which allows connection with light bulb sockets of different configurations. With the extremely quick and simply assembly of the guard considerable time is saved and this is particularly desirable where hundreds or perhaps thousands of bare bulbs must have a guard thereon mounted under existing governmental commerical and industrial safety requirements. The requirement of a guard for each bare light bulb is made whereby a party cannot accidentally touch a hot bulb and through an automatic withdrawal reflex action get into a dangerous position or situation. The guard is also quickly and easily removed.

In the drawings forming part of this application:

Figure 1:
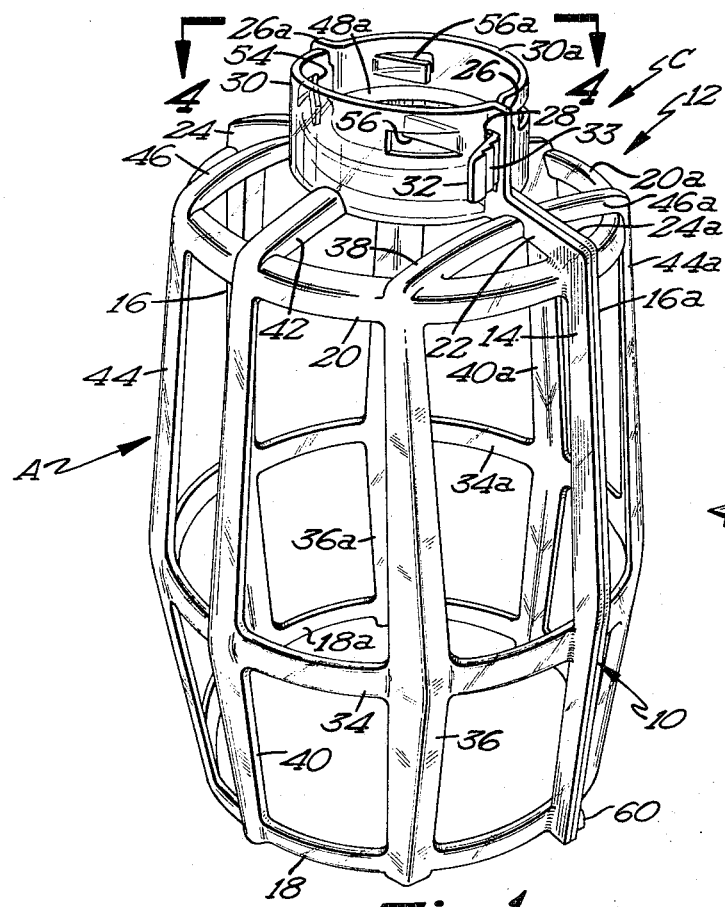
FIG. 1 is a perspective view of a guard for a light bulb embodying the invention.
Figure 5:
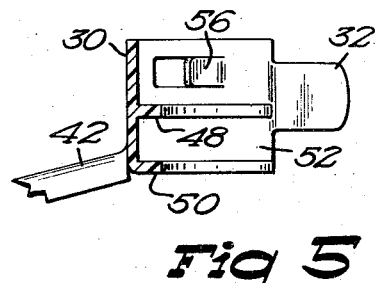
FIG. 5 is a sectional view on the line 5—5 of FIG. 3.
Figure 4:
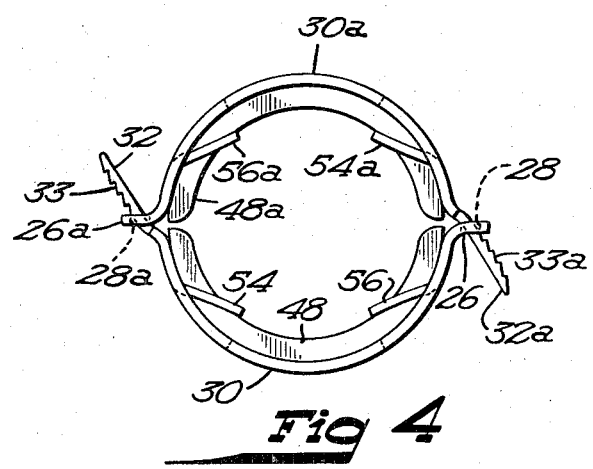
FIG. 4 is a top plan view of the neck portion of the guard.

Referring to the drawings in detail, the light bulb guard A includes the half frame portions 10 and 12. The half portions are identical and therefore only half portion 10 will be described in detail. The two half portions when joined make up a complete open ended cage C. Identical parts of half 12 have been given the same reference numeral but accompanied by a lower case letter *a*. The two half portions make up the entire guard and being identical only a single mold need be made for the entire device. As an example, the device is molded of polycarbonate plastic. No bolts or clips are required. The half guard portion 10 includes the outer longitudinal frame members 14 and 16 which are connected at the outer ends to the outer semi-circular transverse member 18. The inner ends of the longitudinal members 14 and 16 are connected to the inner semi-circular member 20 and at that point the same terminate in the substantially right angle radially extending portion 22 and 24. The inner end of the portion 22 terminates in the lock flange 26 formed with the slot 28.

The flange 26 is formed as part of and extends from the semi-circular band portion 30 and at the opposite end of the semi-circular band portion 30 is the tongue 32. The tongue 32 has formed thereon the serrations 33. Further provided is the intermediate semi-circular member 34 which is connected to or formed as part of the longitudinal members 14 and 16. A further longitudinal member 36 is provided which is connected at its outer end to the outer transverse member 18, intermediately to the transverse member 34 and at its inner end to the inner semi-circular transverse member 20. The upper end also terminates in the right angle radially extending portion 38 which at its inner end is connected to or formed as part of the semi-circular band portion 30. An additional longitudinal member 40 is provided which is connected at its outer end to the outer semi-circular transverse member 18, intermediately to the transverse member 34, and at its upper end to the inner semi-circular transverse member 20. The upper-end of member 40 also terminates in the right angle radially extending portion 42 which at its inner end is connected to the semi-circular band portion 30.

A further longitudinal member 44 is provided which is connected at its outer end to the outer transverse semi-circular member 18, intermediatley to the transverse member 34, and at its inner end to the inner semi-circular transverse member 20. The upper end of member 44 terminates in the right angle radially extending portion 46 which at its inner end is connected to the semi-circular band portion 30.

Intermediate the inner surface of the semi-circular band portion 30 is formed the intermediate flange 48, and formed at the inner end of the band portion 30 is the flange 50. The space between the flanges forms a semi-circular recess 52 on the band portion 30 which when combined with the identical recess 52a of band portion 30a forms a circular recess for the reception of sockets of different configurations such as the circular rib R of a light socket S. With the circular rib R of a light socket in the recess 52, the flanges 48 and 50 also restrict substantially longitudinal movement of the guard on the socket. The semi-circular band portion 30 is formed with the flexible fingers 54 and 56 molded as part of the band portion and extending inwardly of the band portion. The fingers exert a pressure on the light socket S to hold the same within the band portions 30 and 30a and which allow accommodation of light sockets of different diameters.

Also with a plurality of serrations 33 in the tongue 32 the encompassing diameter of the two semi-circular band portions 30 and 30a which form a complete band may be varied by the different positioning of engagement of the tongues 32 and 32a in the slots 28 and 28a. This feature together with the flanges 48 and 50 allow a wide variety of size and shape of light bulb sockets. The longitudinal frame member 14 has formed thereon the lips 58 and 59 which engage on the inner surface of the longitudinal member 14a and guide the two half portions 10 and 12 together and hold the same in assembly against possible release of the tongues 32 and 32a from their respective slots.

Figure 9:
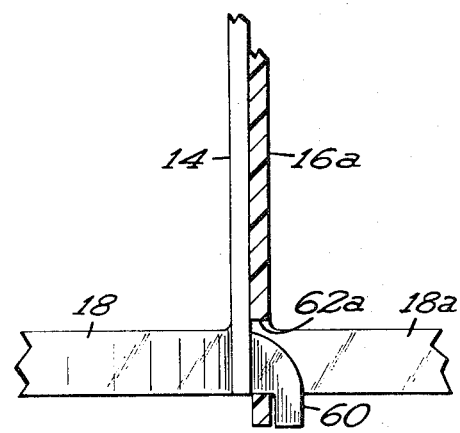
FIG. 9 is a sectional view on the line 9—9 of FIG. 2.
Figure 7:
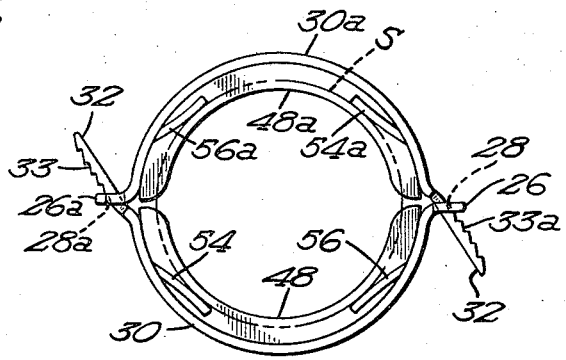
FIG. 7 is a view similar to FIG. 4 but with the neck mounted on a socket.
Figure 6:
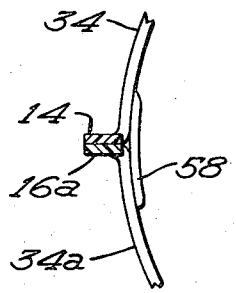
FIG. 6 is a sectional view on the line 6—6 of FIG. 2.
Figure 3:
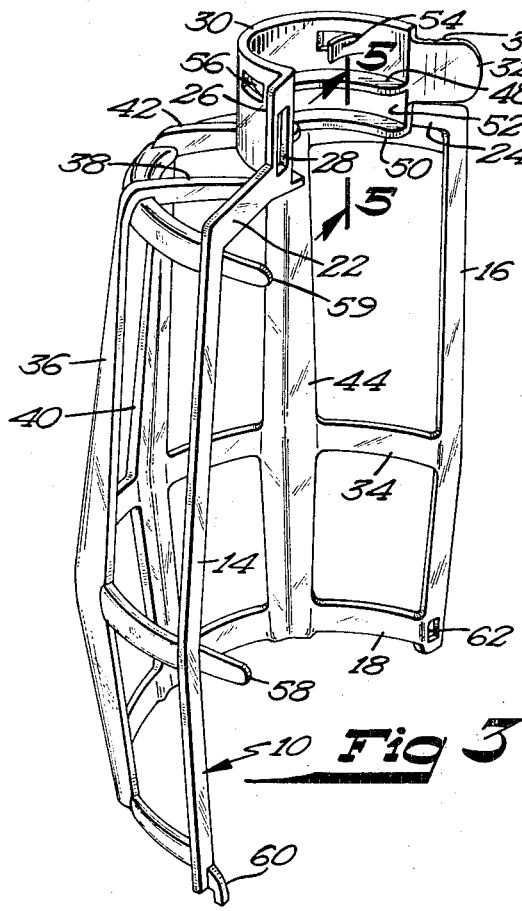
FIG. 3 is a perspective view of the half cage portion of the guard looking at the same substantially from the inside.
Figure 8:
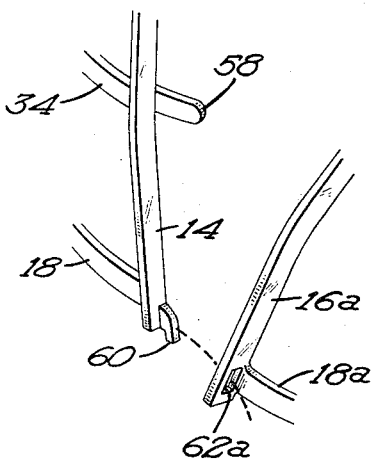
FIG. 8 is a perspective view of a portion of the corners of the half cage portions shown in positions approaching engagement.
Figure 2:
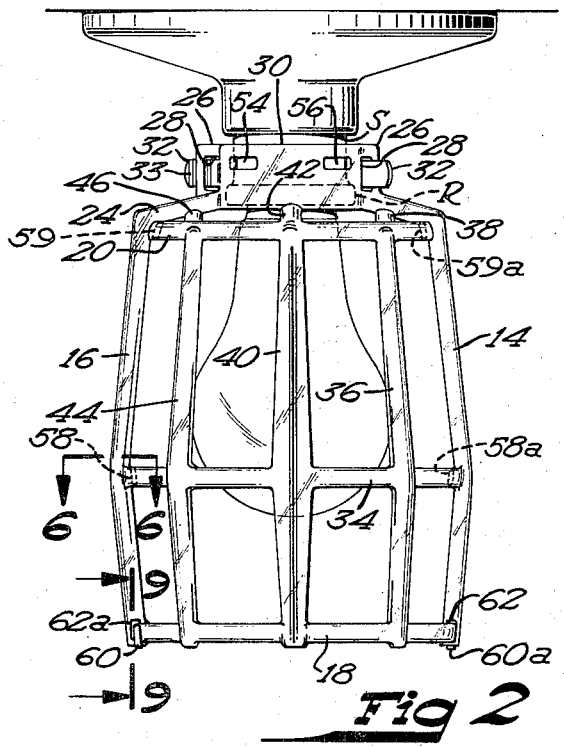
FIG. 2 is a side elevational view of the guard mounted on a light bulb socket.

The lower end of the longitudinal member 14 has formed thereon the hook 60 and the lower end of the longitudinal member 16 is formed with the hole 62 through which the hook 60 engages. The end of the hook 66 engages against the longitudinal member 16a, FIG. 9 in particular.

ASSEMBLY

To assemble the light guard A the hook 60 is engaged in a hole 62a and the hook 60a is engaged in a hole 62. The upper ends of the half portions 10 and 12 are then brought together with the tongue 32 engaged in the slot 28a and the tongue 32a engaged in the slot 28. The band portions 30 and 30a are then pressed together so that the serrations of the tongues 32 and 32a tightly engage the edges of the slots 28a and 32, respectively. It will be seen that with the serrated tongues engaging the slots that various diameter light sockets may be engaged by the device A, and when the guard A is so mounted, the spring fingers 54, 56, 54a and 56a engage the light socket to take up for any inequality and position semi-circular band portions 30 and 30a axially of the socket S. With the guard assembled the rib R is within the annular recess 52 after the engagement of the hooks 60 and 60a within the holes 62a and 62 respectively. The guard may be easily disassembled and removed from the light socket by bending the tongues slightly so that the serrations do not engage the edges of the slots and then removing each of the tongues from the slots. The hooks 60 and 60 a are easily removed from the holes 62a and 62.

I claim:

1. A light bulb guard for mounting on a light bulb socket and enclosing a light bulb comprising:
   a. First and second identical half cage members each including
   b. A semi-circular band portion extending outwardly from the inner end thereof,
   c. each half cage member having a body terminating in a outer-end portion,
   d. means for connecting the semi-circular band portions of said half cage members together to form a circular band for engagement with a light socket;
   e. means carried by each of said semi-circular band portions on the inner surface thereof for receiving portions of a light socket, and
   f. means for connecting the outer end portions of the cage members together to form an open end through which a light bulb may be moved.

2. The device of claim 1 in which said connecting means for said semi-circular band portions is adjustable.

3. The device of claim 2 in which said semi-circular band portions carry means on the inner surface thereof for compensating for different diameter light bulb sockets.

4. The device of claim 3 in which said means for compensating for different diameter light bulb sockets includes spring fingers carried by the inner-surface of said semi-circular band portions.

5. The device of claim 4 in which said means for connecting the semi-circular band portions together includes a tongue on one end of the semi-circular band portion and a slot on the other end, the tongue of each semi-circular band portion engageable in the slot of each semi-circular band portion.

6. The device of claim 5 in which said adjustable connecting means includes a plurality of serrations on said tongue any of which is engageable with an edge of the slot.

7. The device of claim 2 in which said means for connecting the outer ends of the cage members together includes a hook and a hook receiver hole carried by each half cage member at the outer ends of the outer end portions, the hook of each half cage member engageable in the receiver hole of each half cage member.

8. The device of claim 1 in which said means for connecting the semi-circular band portions together includes a tongue on one end of the semi-circular band portion and a slot on the other end, the tongue of each semi-circular band portion engageable in the slot of each semi-circular band portion.

9. The device of claim 1 in which said means for connecting the outer ends of the cage members together includes a hook and a hook-receiver hole carried by each half cage member at the outer ends of the outer end portions, the hook of each half cage member engageable in the receiver hole of each half cage member.

* * * * *